UNITED STATES PATENT OFFICE.

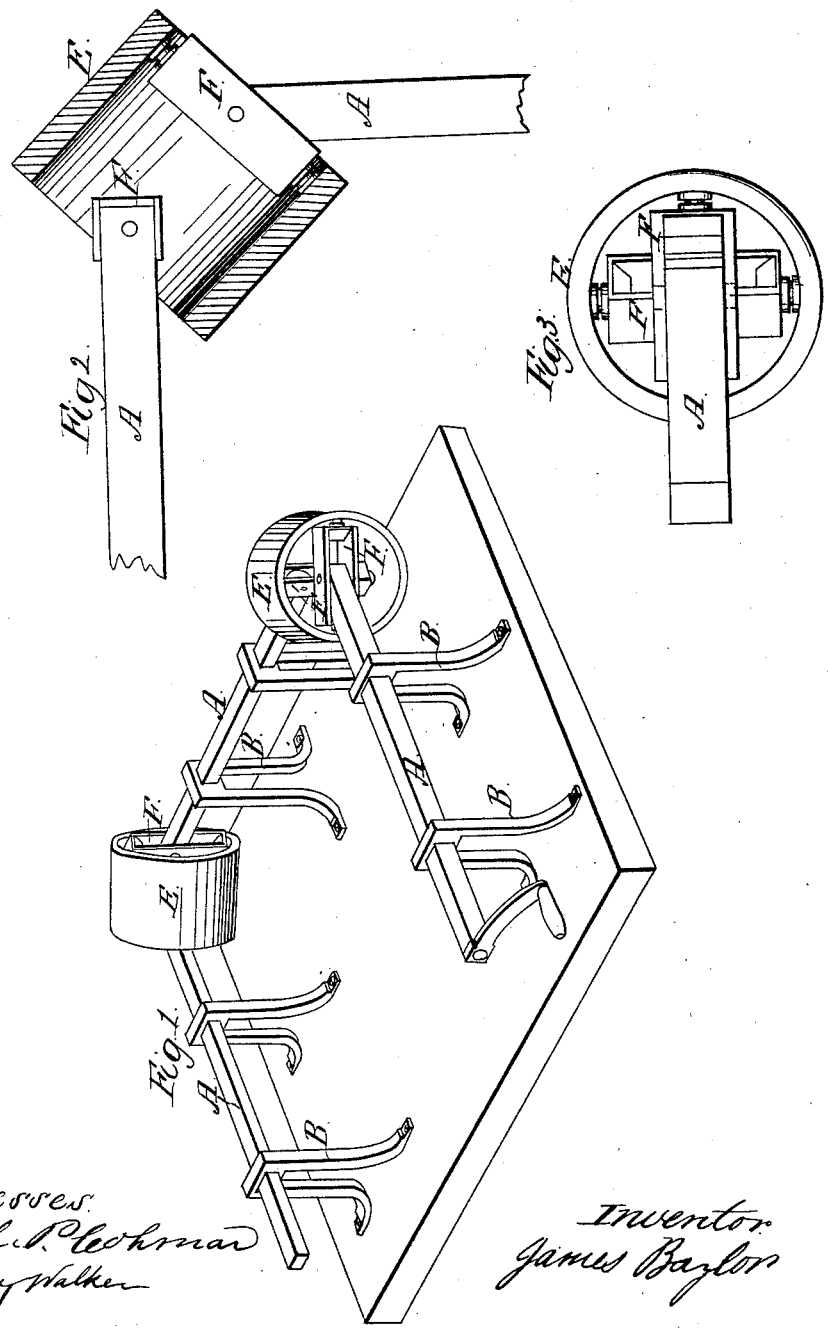

JAMES BAYLOR, OF CANTON, ILLINOIS.

UNIVERSAL JOINT.

Specification of Letters Patent No. 24,786, dated July 19, 1859.

*To all whom it may concern:*

Be it known that I, JAMES BAYLOR, of Canton, in the county of Fulton and State of Illinois, have invented a new and useful Improvement in Universal Joints for Connecting Shafts, &c.; and I do hereby declare that the following is a full, clear, and exact description thereof, reference being had to the accompanying drawings, and to the letters of reference marked thereon, of which—

Figure 1 represents a perspective view of a line of shafting connected at right angles by the universal joint of my invention. Fig. 2, is a sectional view showing the arrangement for coupling the shafts at right angles, Fig. 3, is an end view of the joint.

The nature of my invention consists in the employment of a cylindrical coupling box having two slotted bars pivoted within, and at either end of the box, at right angles to each other; to the centers of which the ends of the shafts are pivoted, so that a rotatory motion can be conveyed from one shaft to the other, when they have a considerable inclination, thereby dispensing with the miter or beveled wheels commonly employed for this purpose, and obtaining a regularity of motion with very little friction, described as follows:—

A, are the shafts, three being shown in the drawing, placed at right angles to each other and mounted upon pedestals or hangers B, in which they have their bearings.

E, is a cylindrical coupling box placed diagonally from one end of one shaft to that of the other. In either end of this cylinder E, is pivoted a slotted bar or axle F, placed at right angles to each other and diametrically to the cylinder. These bars receive the ends of the shafts A. which are centrally pivoted to the shafts so that the axis of motion of the shafts will form an obtuse angle with the axis of motion of the cylinder. This being greater or less according to the angularity of the shafts.

This joint is applicable to any ordinary sized shaft and will transmit motion at any degree of speed. It is cheap and durable and obviates the side friction created in spur wheel gearing or friction pulleys, and should any of its parts get deranged they can be easily repaired instead of throwing away the whole joint.

What I claim as my invention and desire to secure by Letters Patent, is,

Connecting shafts when placed angularly with each other by means of the universal joints constructed as represented and described by which a rotatory motion may be transmitted from one shaft to the other.

JAMES BAYLOR.

Witnesses:
H. WALKER,
JEREMIAH P. COLEMAN.